United States Patent [19]

Vallyathan et al.

[11] Patent Number: 5,096,733
[45] Date of Patent: Mar. 17, 1992

[54] PREVENTION OF THE ACUTE CYTOTOXICITY ASSOCIATED WITH SILICA CONTAINING MINERALS

[75] Inventors: Val Vallyathan; Vincent Castranova; Nar S. Dalal; Knox Van Dyke, all of Morgantown, W. Va.

[73] Assignee: The United States of America as represented by the Secretary of the Dept. of Health and Human Services, Washington, D.C.

[21] Appl. No.: 429,033

[22] Filed: Oct. 30, 1989

[51] Int. Cl.$^5$ .............................................. B05D 7/24
[52] U.S. Cl. ........................................ 427/2; 427/220; 428/405
[58] Field of Search .............. 427/220, 136, 221; 523/212, 213; 106/466; 428/404, 405

[56] References Cited

U.S. PATENT DOCUMENTS

| | | | |
|---|---|---|---|
| 3,946,131 | 3/1976 | Biefeld et al. | 523/213 |
| 4,145,359 | 3/1979 | Homan et al. | 523/213 |
| 4,175,159 | 11/1979 | Raleigh | 427/221 |
| 4,724,167 | 2/1988 | Evans et al. | 427/221 |
| 4,781,950 | 11/1988 | Giesing et al. | 427/136 |
| 4,906,676 | 3/1990 | Ida | 523/213 |

FOREIGN PATENT DOCUMENTS

| | | | |
|---|---|---|---|
| 627933 | 9/1961 | Canada | 427/221 |
| 255079 | 2/1988 | European Pat. Off. | 523/213 |
| 78851 | 1/1971 | Fed. Rep. of Germany | 427/221 |
| 2010426 | 2/1970 | France | 427/221 |
| 47-16821 | 5/1972 | Japan | 427/221 |
| 54-37121 | 3/1979 | Japan | 427/221 |
| 1-113454 | 5/1989 | Japan | 523/213 |
| 1-141960 | 6/1989 | Japan | 523/213 |

*Primary Examiner*—Shrive Beck
*Assistant Examiner*—Terry J. Owens
*Attorney, Agent, or Firm*—Birch, Stewart, Kolasch & Birch

[57] ABSTRACT

Cytotoxic effects associated with ground fractured silica-containing minerals and silicates, including asbestos, are prevented by coating the silica-containing minerals and silicates with an aqueous solution containing an aqueously compatible silane coupling agent so that a monomolecular film is formed on the surface of the silica-containing minerals and silicates.

10 Claims, No Drawings

PREVENTION OF THE ACUTE CYTOTOXICITY ASSOCIATED WITH SILICA CONTAINING MINERALS

FIELD OF THE INVENTION

The present invention is primarily concerned with a method of preventing the acute cytotoxicity associated with freshly ground or fractured silica or silica containing minerals, including coal and asbestos, and thereby also helping to prevent pulmonary diseases which can result from exposure to such freshly ground and fractured silica or silica containing minerals.

BACKGROUND OF THE INVENTION

Occupational exposure to crystalline silica can be associated with either chronic or acute pulmonary disease. Chronic silicosis becomes manifest 20 to 40 years after first exposure and is characterized by development of concentric hyalinized nodular lesions in the lung with the development of dyspnea over a period of several decades. Acute silicosis, on the other hand, is manifested by a rapid onset after exposure and is characterized by the accumulation of an amorphous granular lipoprotein exudate in the airspaces and rapid development of respiratory disability within a few years.

Information is growing concerning the etiology of chronic silicosis. Studies suggest that several mechanisms may be involved in the development of fibrosis. Lung injury may result from silica-induced release of lysosomal enzymes from alveolar macrophages (1, 2). In addition, silica-induced activation of superoxide anion and hydrogen peroxide release from alveolar macrophages may result in oxidant-induced damage to lung parenchyma (3). Silica exposure can also result in the release of mediators from alveolar macrophages which enhance the proliferation of fibroblasts and the synthesis of collagen by these pneumocytes (4, 5).

In comparison with chronic silicosis, very little is known concerning the development of acute silicosis. Because the pulmonary responses to silica differ in the chronic and acute presentation of disease, it does not seem likely that acute silicosis can be explained simply as the response of the lung to high levels of silica. Acute silicosis is commonly associated with sandblasting, rock drilling, tunnelling, and silica mill operations, i.e., operations in which silica particles are crushed or sheared (6). Therefore, it is possible that freshly sheared silica may have surface properties that make it more reactive with lung tissue than aged silica, and that it is this unique reactivity of freshly sheared silica that leads to manifestation of acute pulmonary disease.

Studies have suggested that freshly fractured silica may exhibit surface reactivity not found in aged silica. Hochstrasser and Antinini (7) reported that silicon-based radicals could be generated upon cleavage of a quartz crystal under ultra-high vacuum ($10^{-10}$ mm Hg). Karmanova and colleagues (8) reported release of singlet oxygen from silica dust upon heating, whereas Kolbanev and associates (9) reported generation of $H_2O_2$ from the reaction of freshly ground silica with water. In addition, Marasas and Harington (10) reported that silica exhibits oxidant properties that may be related to its pathogenicity.

Vallyathan et al (Am. Rev. Respir. Dis., 138:1213-1219 (1988)) have reported that freshly fractured silica exhibits surface characteristics and biological reactivity distinct from aged silica, that grinding of silica produced $\sim 10^{18}$ $\overset{\cdot}{Si}$ and $Si-\overset{\cdot}{O}$ (silicon based radicals per gram of dust) on the particulate surface, which were characterized by an electron spin resonance (ESR) spectrum centered around g=2.0015, and that these radicals react with aqueous media to produce OH radicals (demonstrated using a DMPO spin trap); that when compared to aged silica, freshly ground silica exhibits a greater cytotoxic effect on cellular membrane integrity (i.e., it showed a 1.5-fold increase in lactate dehydrogenase (LDH) release from macrophages, a 36-fold increase in hemolytic activity, and a 3-fold increase in the ability to induce lipid peroxidation as compared with aged silica).

It was postulated by Vallyathan et al in the same report that because acute silicosis is frequently associated with occupations in which freshly fractured crystalline silica of respirable size is generated, and that fracture-generated silicon-based radicals may play a significant role in the pathogenesis of the disease. Am. Rev. Respir. Dis., 138:1213-1219 (1988) is herein incorporated by reference.

SUMMARY OF THE INVENTION

The present inventors have developed a method which when properly followed may prevent the acute cytotoxicity of freshly fractured silica and silica containing minerals including asbestos and coal mine dust containing silica. The method entails coating silica containing minerals, including coal, with a monomolecular film of an aqueously compatible silane coupling agent, either during milling, processing or after grinding or fracturing of silica or silica containing materials. The method could be utilized in sandblasting, rock drilling, tunnelling, and silica mill operations, or any other occupation where crystalline silica particles, or silica or coal particles, of respirable size are generated.

The present invention also provides for a method of preventing certain pulmonary diseases, which up to now have been considered as occupational hazards in certain professions, such as coal mining and any other profession where persons are subjected to the inhalation of small particles of freshly fractured or ground silica containing minerals.

More specifically, the present invention provides for the following:

1. A method of preventing the acute cytotoxicity associated with freshly ground or fractured silica, silica containing materials or silicates, which comprises: coating said silica, silica containing minerals or silicates with an aqueous solution comprising an aqueously compatible silane coupling agent.

2. The method of paragraph 1, wherein said silica, silica containing minerals or silicates are coated with an aqueous solution having diluted therein from about 1.0% to about 0.00001% w/v (weight/volume) of said aqueously compatible silane coupling agent.

3. The method of paragraph 1, wherein said silica containing minerals are coated with an aqueous solution having diluted therein from about 0.1% to about 0.0001% w/v of said aqueously compatible silane coupling agent.

4. The method of paragraphs 1-3, wherein said silica containing minerals are coal, asbestos or quartz.

5. The method of paragraphs 1-4, wherein said aqueously compatible silane coupling agent is selected from a compound having the formula:

$$R^1—Si—(R^2)_3 \quad \text{Formula II}$$

wherein, $R^1$ is lower alkyl, ($R^3$)-lower alkyl, (lower alkyl)amine or (($R^3$)-lower alkyl)amine;

$R^2$ is hydroxy or lower alkoxy; and $R^3$ is phenyl, carboxy, amino, amido, mercapto, (amino) lower alkyl, ((amino) lower alkyl)amine, (lower alkylene) carbonyl or (epoxy) lower alkyl.

6. The method of paragraph 1, wherein said silane coupling agent is contained in one of the following concentrates: PROSIL-28, PROSIL-178, PROSIL-196, PROSIL-220, PROSIL-221, PROSIL-248, PROSIL-2107, PROSIL-2210, PROSIL-2213, PROSIL-3128, PROSIL-5136, PROSIL-9102, PROSIL-9214 or PROSIL-9215.

7. A method for preventing the occurrence of silicosis or pneumoconiosis in a person coming in contact with fractured or ground silica, silica containing minerals or silicates, which comprises coating ground or fractured silica, silica containing minerals or silicates, as provided for in paragraphs 1-6 with an aqueous compatible silane coupling agent as provided for in paragraphs 1-6.

8. The method of paragraph 7, wherein said silicosis is acute silicosis and said silica containing mineral is asbestos, quartz or coal.

9. The method of paragraph 8, wherein said silicosis is acute silicosis, said person is a coal or asbestos miner and said silica containing minerals are coal or asbestos.

The following glossary of terms is provided in order to aid those skilled in the art in practicing the present invention.

The term "silica containing minerals" refers to minerals such as coal, asbestos, quartz or the like, which contain therein silica (crystalline silicon dioxide) or silicates.

The term "silane coupling agent" as used herein means organosilane monomers which are characterized by the formula:

$$R—Si(R')(R'')(R''') \quad \text{Formula I}$$

wherein R is an organofunctional group; and the R', R", and R''' are hydroxyl groups or are hydrolyzable groups that convert to silanol groups or react readily with silanols or metal oxides. R', R" and R''' may be the same or different. For silane coupling agents to be considered useful in the present invention and encompassed by Formula I herein, the same should be aqueously compatible. The silane coupling agents encompassed by Formula II herein are to be considered as a subset of the acceptable silane coupling agents encompassed by Formula I herein.

The term "aqueously compatible" as used herein with reference to silane coupling agents means that one part of the silane coupling agent is at least soluble in 100,000 parts of water w/v.

The term "PROSIL" as used herein is a registered trademark relating to a commercial line of concentrates of silane coupling agents which are commercially available from PCK Incorporated, P.O Box 1466, Gainesville, Fla. 32602, U.S.A., Telephone: 1-800-331-6313. Many of the silane coupling agents contained in the "PROSIL" brand of silane coupling agents are considered as encompassed herein by both Formulas I and II. Exemplary of "PROSIL" brand coupling agent concentrates which contain silane coupling agents, which are considered encompassed in the present invention, are as follows:

PROSIL-28;
PROSIL-178 (isobutyltrimethoxysilane);
PROSIL-196 (mercaptopropyltrimethoxysilane);
PROSIL-220 (aminopropyltriethoxysilane);
PROSIL-221 (aminopropyltriethoxysilane);
PROSIL-248 (3-methacryloxypropyltrimethoxysilane);
PROSIL-3128 (n-(2-aminoethyl)-3-amino-propyltrimethoxysilane);
PROSIL-5136 (3-glycidoxypropyltrimethoxysilane);
PROSIL-9202 (n-octyltriethoxysilane);
PROSIL-2210; PROSIL-2213; PROSIL-9102; PROSIL-9214;
PROSIL-9215; and PROSIL-2107.

The term "lower alkyl" as used herein means branch and straight chain alkyl radicals having 1-8 carbon atoms. Exemplary of such radicals include methyl, ethyl, n-propyl, 2-propyl, butyl, 2-butyl, t-butyl, amyl isoamyl, hexyl, heptyl, octyl, and the like.

The term "lower alkylene" as used herein refers to an alkylene radical having 2-8 carbon atoms. Exemplary of such radicals are ethylene, propylene, 2-butylene, and the like.

The term "(amino) lower alkyl" as used herein means a lower alkyl radical substituted by an amino moiety, i.e., $—NH_2$.

The term "((amino) lower alkyl)amine" as used herein refers to a radical having the formula (($NH_2$)-lower alkyl) —NH—.

The term "(lower alkyl) amine" as used herein refers to a radical having the formula (lower alkyl) NH—.

The term "(($R^3$)-lower alkyl)amine" as used herein refers to a radical having the formula (($R^3$)-lower alkyl)—NH—.

The term "(epoxy) lower alkyl" as used herein refers to a lower alkyl radical connected to two adjacent carbon atoms, which are bonded together, a single oxygen atom so that an epoxide group such as the following:

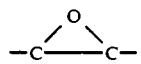

is present on the lower alkyl radical.

The term "(lower alkylene) carbonyl" as used herein refers to a (lower alkylene) C(O)- radical.

DETAILED DESCRIPTION OF THE INVENTION

The present invention discloses a method which when properly followed may prevent the acute cytotoxicity of freshly fractured or ground silica and silicates, including asbestos. The method disclosed herein for preventing such acute cytotoxicity can also aid in preventing such pulmonary diseases as silicosis and pneumoconiosis (including black lung and asbestosis).

The method disclosed herein involves the coating of freshly fractured or ground silica, silica containing minerals or silicate minerals with a layer of an aqueously compatible silane coupling agent, so that free radicals, e.g., Si and Si—O, which are formed in the fractioning or grinding of silica, silica containing minerals or silicates are prevented from forming further radicals, such as hydroxyl radicals which are highly reactive towards biological tissues (11, 12, 13) and which have important implications regarding the medical effects of inhaling silica.

Vallyathan et al, supra., have shown that upon crushing $\sim 10^{18}$ a $\overset{.}{Si}$ and $Si—\overset{.}{O}$ radicals are produced per gram of silica dust, and as such, when silica containing minerals are crushed, fractured, etc., it is considered herein that the following reactions may explain what takes place at the surface of the minerals, and further show what accounts for the cytotoxicity of freshly ground or fractured silica.

$$Si—O—Si \rightarrow \overset{.}{Si} + \overset{.}{Si}O \quad (I)$$

$$\overset{.}{Si}O + H_2O \rightarrow SiOH + \overset{.}{O}H \quad (II)$$

$$\overset{.}{Si}O + \overset{.}{O}H \rightarrow SiOOH \quad (III)$$

$$SiOOH + H_2O \rightarrow SiOH + H_2O_2 \quad (IV)$$

$$\overset{.}{Si} + H_2O_2 \rightarrow SiOH + \overset{.}{O}H \quad (V)$$

Additionally, it is noted that if iron +2 exist in a silica containing mineral sample, it is also possible that the following Fenton reaction takes place:

$$Fe^{+2} + H_2O_2 \rightarrow Fe^{+3} + OH^- + \overset{.}{O}H^- \quad (VI)$$

While the present inventors provide the above reaction equations to help demonstrate the free radical formations which may account for the acute cytotoxic properties associated with freshly fractured or ground silica, silica containing minerals or silicates, the same should not be considered to limit the present invention, since the silane coupling agents of the present invention are shown herein to make less toxic freshly ground or fractured silica in in vitro testing procedures.

We note that certain reasons for suggesting that the above reactions take place at the surface of appropriate silica particles are also outlined in the Vallyathan et al reference, supra., hereby incorporated by reference.

In the present invention it is envisioned that the coating of freshly ground or fractured silica, silica containing minerals or silicates may occur either during fracturing or grinding, or shortly thereafter. However, if the coating occurs after fracturing or grinding it is thought preferable to perform the same as soon as possible after the fracturing or grinding of the silica, silica containing minerals or silicates so as to limit possible exposure by inhalation to the acute cytotoxic properties associated with freshly fractured or ground silica or silicate containing materials.

It is noted that while the present invention emphasizes the need to coat freshly fractured silica containing materials, this is mainly due to the fact it is thought that freshly fractured or ground silica containing materials have acute cytotoxic properties not present in aged materials. However, the use of such language herein should in no way be construed to limit from the present invention the coating of previously fractured or aged materials, since one may also desire to limit whatever cytotoxic properties exist with inhalation of the same, that is respirable dust particles having free radicals thereon. This is thought especially true since even though the half-life of hydroxyl radicals is only about a day on storage in the air, a substantial potency of hydroxyl radicals can be present after a period of four days, and in addition, silica and silicate dusts aged for years still can retain their ability to stimulate alveolar macrophage (14), decrease membrane integrity (15, 16) and cause lipid peroxidation (15, 17, 18).

In the present invention there is provided solely for the use of aqueously compatible silane coupling agents, this is done since it is thought that the use of such aqueous compatibility greatly faciliates the ease of application of silane coupling agents to the surface of silica, silica containing minerals and silicates (e.g., aqueous solutions). As such, the present invention is also considered as fully encompassing the utilization of an appropriate silane coupling agent of Formula I and II, or one of the same in a concentrate (such as PROSIL 28), diluted in water (w/v) at a ratio of about 1:100 to 1:100,000. Such a solution could be utilized, if desired, in drill cooling water for either mineral-type drills or continuous miners, or simply used to coat powders generated during mining and which powders generally contain silica particles capable of being inhaled. It is noted that when a silane coupling agent is included in drill water for cooling a drill, heat from the drill can help drive chemical reactions forward so that a monomolecular film is formed on the silica so that silica radicals, e.g., $\overset{.}{Si}$ and $Si—\overset{.}{O}$, are removed from the silica's surface.

In view of the above, and notwithstanding that one could possibly utilize any silane coupling agent (without respect to aqueous compatibility) to prevent the acute cytotoxic effects associated with freshly ground or fractured silica, silica containing minerals and silicates, we herein provide that the silane coupling agent encompassed herein should be aqueously compatible. That is, they should be at least dilutable in an aqueous medium in an amount of at least about part in 100,000 parts w/v and more preferably dilutable in an aqueous medium in an amount of at least 1 part per 10,000 parts w/v. In this respect, it is noted that the most preferred silane coupling agent of the present invention is contained in the concentrate PROSIL-28, and is easily dilutable in water at a ratio of up to 1 part per 100 parts water.

It is noted, that if one uses a concentrate of one or more of the silane coupling agents herein encompassed in preparing a dilute solution, to coat silica containing coal or other silica containing minerals, the percentage (% w/v or % w/w) of the silane coupling agent(s) contained in the concentrate should be determined, so that appr.opriate proportions of water and concentrate can be mixed. Appropriate proportions of a silane coupling agent concentrates in water are preferably those proportions which produce aqueous solutions containing from about 0.1% to about 0.0001% w/v of an aqueous compatible silane coupling agent, herein encompassed, and even more preferrably from about 1.0% to about 0.00001% w/v of an aqueous compatible silane coupling agent, herein encompassed.

Generally, it is thought that as a group, the most preferred silane coupling agents useful in the present invention are compounds having the formula:

$$R^1—Si—(R^2)_3 \quad \text{Formula II}$$

wherein, $R^1$ is lower alkyl, $(R^3)$-lower alkyl, (lower alkyl) amine or $((R^3)$-lower alkyl)amine;

$R^2$ is hydroxy or lower alkoxy; and $R^3$ is phenyl, carboxy, amino, amide, mercapto, (amine) lower alkyl, ((amino) lower alkyl) amine, (lower alkylene) carbonyl, or (epoxy) lower alkyl.

The above silane coupling agents are generally believed to be preferred in the present invention since they are aqueously compatible and generally may be obtained commercially, thus precluding the need for preparation of the same. It is noted that many of the above compounds encompassed by Formula II can be obtained in a concentrate from PCR Incorporated, P.O. Box 1466, Gainesville, Fla. 32602, U.S.A.

Having set forth what are acceptable silane coupling agents to use in the present invention, attention is turned to formation of monomolecular films, with the same, on freshly ground or fractured silica, silica containing minerals or silicates, so that control of cytotoxicity associated therewith is achieved.

The following discussion will center upon the use of compounds of Formula II to provide a monomolecular coating on silica containing minerals, but the same should not be considered to unduly limit the present invention since compounds of Formula I also form monomolecular coatings, in about an identical manner.

Generally, when using one of the silane coupling agents, encompassed by Formula II herein, the $R^2$ groups contained therein can easily be hydrolyzed to form trisilanol groups (when $R^2$ is other than hydroxy, since otherwise trisilanol groups are already present) which can readily react with surface silanols and oxides on a freshly fractured silica containing mineral in the following manner:

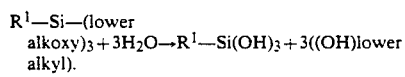

The trisilanol groups ($R^1$—Si(OH)$_3$ in the above equation) can react with silicon groups at the silica containing substrate surface, forming strong hydrogen bonding at the interface, and furthermore can bind with themselves. However, since all of these reactions are thought in equilibrium, it is difficult at best to say which reaction predominates, and as such it is thought only necessary to know that the silane coupling agent forms a monomolecular film on the substrate surface, and that this film prevents the cytotoxic properties associated with freshly fractured silica containing minerals.

In order to more fully disclose the present invention, the following experimental section is included to exemplify how the methods of the present invention serve to prevent the cytotoxic properties associated with freshly ground or fractured silica containing materials. Furthermore, the Experimental Section serves to show how the method of the present invention can be utilized to prevent pneumoconiosis and such related pulmonary diseases associated with the inhalation of silica and silicate particles (including asbestos). It should be understood, that the present invention is to only be limited by the scope of the appended claims and is not to be limited by the following Experimental Section.

EXPERIMENTAL SECTION

Several experimental procedures were used to evaluate the increased generation of oxygen radicals on silica and coal, as well as their trapping, suppression, and evaluation of toxicity. These methods are described briefly.

Materials

Bulk crystalline silica and coal samples were obtained from the Generic Respirable Dust Technology Center, Pa. State University, State College, Pa. Silica was at least 99% pure as determined by X-ray energy spectrometric analysis and coal samples were bituminous (72% carbon) and anthracite (95% carbon). Silica and coal samples were hand ground in an agate mortar with pestle for 30 minutes and sieved through a 20 μm mesh filter before use.

Surface Coating

A monomolecular surface coating was accomplished through the formation of chemical bonds between the organosilane coupling agent in "PROSIL-28" and silica. The "organosolane coupling agent" in "PROSIL-28" provided a strong chemical bond on silica. For the test studies freshly ground silica was treated in a diluted solution (1:100) of the "PROSIL-28" concentrate for 30 seconds and then rinsed with 3 changes of distilled water to remove excess "PROSIL-28". After rinsing with water, the silica was air dried at 100° C. for 10 minutes to remove the water.

Electron Spin Resonance (ESR)

Free radical generated by crushing of silica and coal was detected and measured using ESR. ESR measurements were made at X-band (~9.7 GH$_z$) using a Bruker ER 200D ESR Spectrometer. Measurements of g values and hyperfine splittings were made with the aid of magnetic field self-tracking NMR Gaussmeter (Bruker Model ER 035M) and the microwave frequency measured with a Hewlett-Packard (Model 5340A) frequency counter.

Cytotoxicity Measurements

Cytotoxicity was measured using the hemolytic potential of the freshly ground and coated silica. For these measurements 2% sheep erythrocytes were incubated with freshly ground silica and freshly ground silica treated with "PROSIL-28". The test system consisted of 2 ml, 2% sheep erythrocytes and 2 ml phosphate-buffered saline (PBS) with 10 mg of treated or untreated silica. After the incubation at 37° C. for 1 hour, the samples were centrifuged and the optical density of hemoglobin released was read at 540 nm using a Gilford spectrophotometer. The procedure was calibrated by substituting PBS for negative control and 0.5% TRITON-X-100 as a positive control for 100% hemolysis. The percentage of hemolysis was calculated from the difference of absorbance based on 100% lysis by TRITON-X-100 and samples.

Luminescence Measurements

Crushing or grinding of silica resulted in the generation of light. This generation of light was detected and measured during a scintillation counter or luminometer. Luminescence emitted from silica was measured as counts per minute in the tritium channel of a liquid scintillation counter (Packard Tri-Carb, Downers Grov, Ill.) operated in the out-of-coincidence mode. The effect of various suppressors of light emission was measured in Hepesbuffered medium containing the suppressors of biologic oxygen scavengers. These included catalase, superoxide dismutase (SOD), 5,5-dimethyl-1-pyrroline-1-oxide (DMPO), sodium benzoate, dimethyl sulfoxide (DMSO), 1,3 dimethyl-2-thiourea (DMTU) and "PROSIL-28".

RESULTS

It having recently been shown that mechanical crushing or grinding of crystalline silica produces a significant concentration of free radicals and that these radicals are responsible for the increased toxicity of silica as in occupational exposures of sandblasting, tunnelling, drilling, or silica flour mills, we have searched for a suitable agent that would suppress the mineral cytotoxicity and thereby prevent or control the silicosis and black lung disease. Many factors were considered important attributes of the surface coating agent including no adverse toxic reactions, ease of application, availability, and cost. After several tests, as described above, we have identified the organosilane coupling agent in "PROSIL-28" concentrate as producing an excellent monomolecular coating which remains on silica under normal conditions and temperatures (up to 100° C.), and is stable to the digestive actions of lysosomal enzymes so that retoxification of silica containing minerals does not occur in lungs even after several years.

As a result of these findings, mainly that the organosilane coupling agent in "PROSIL-28" (an aqueous compatible, alkylated trisilanol, encompassed by both Formulas I and II herein) is useful in the methods of the present invention, it is thought that other compounds which are encompassed by Formulas I and II herein are applicable to use in the methods of the present invention, and that expectable results would be obtained therewith. Such expectable results would include prevention of the acute cytotoxicity associated with freshly ground or fractured silica containing minerals, and moreover prevention of the occurrence of pulmonary diseases, such as silicosis and pneumoconiosis, which are associated with the respiration of small particles of silica containing minerals. The compounds, of course, could also expectedly be utilized to remove cytotoxic properties associated with ground or fractured coal, even if the same was not freshly ground or fractured.

The present invention is to be limited only by the scope of the claims, appended hereto.

REFERENCES

1. Heppleston AG, Silicotic fibrogenesis: a concept of pulmonary fibrosis. Ann Occup Hyg 1982; 26: 449-62.
2. Davis GS. The pathogenesis of silicosis. Chest 1986; 89:166-69s.
3. Weiss SH, LoBuglio AF. Biology of disease: phagocyte-generated oxygen metabolites and cellular injury. Lab Invest 1982; 47:5-18.
4. Heppleston AG, Styles JA. Activity of macrophage factor in collagen formation by silica. Nature 1967; 214:521-2.
5. Bittermann PB, Rennard SI, Hunninghake GW, Crystal RG. Human alveolar macrophage growth factor for fibroblasts: regulation and partial characterization. J Clin Invest 1982; 70:806-22.
6. Banks DE. Acute silicosis. In: Merchant JA, ed. Occupational respiratory diseases. Washington, D.C.: U.S. Department of Health, Publication No.86-102, U.S.Government Printing Office, 1986; 239-41.
7. Hochstrasser G, Antinini JF. Surface states of pristine silica surfaces. Surface Sci 1972; 644-64.
8. Karmanova EV, Myasnikov IA, Zayalov SA. Mechanism of the emission of singlet oxygen molecules from a disordered quartz surface. Zhurnal Fizichestoi Khimii 1984; 58:1958-61.
9. Kolbanev IV, Berestetskaya IV, Butyagin PY. Mechanochemistry of quartz surface. Kinetika i Kataliz 1980; 21:1154-8.
10. Marasas LW, Harington JS. Some oxidative and hydroxylative action of quartz: their possible relationship to the development of silicosis. Nature 1960; 188:1173-4.
11. Bolis V, Fubini B, Venturello G. Surface characterization of various silica. J Thermal Anal 1983; 28:249-57.
12. Halliwell B. Oxidants and human disease: some new concepts. FASEB J 1987; 1:358-64.
13. Halliwell B, Gutteridge JMC. The importance of free radicals and catalytic metal ions in human disease. Mol Aspects Med 1985; 8:189-93.
14. Castranova V, Pailes WH, Li C. Effects of silica exposure on alveolar macrophages (AM): action of tetrandrine. The Toxicologist 1988; 8:199.
15. Singh VS, Rahman Q. Interrelationship between hemolysis and lipid peroxidation of human erythrocytes induced by silicic acid and silicate dusts. J. Appl Toxicol 1987; 7:91-6.
16. Wallace WE Jr, Vallyathan V, Keane MJ, Robinson V. in vitro biologic toxicity of native and surface-modified silica and kaolin. J Toxicol Environ Health 1985; 16:415-24.
17. Gabor S, Anca Z. Effect of silica on lipid peroxidation in the red cells. Int Arch Arbeitsmed 1974; 32:327-32.
18. Gabor S, Anca Z, Zugravu E. In vitro action of quartz on alveolar macrophage lipid peroxides. Arch Environ Health 1975; 30:49-501.

What is claimed is:

1. A method of preventing the cytotoxicity associated with ground or fractured silica or silicate containing minerals which comprises:
   coating said minerals with an aqueous solution comprising an aqueously compatible silane coupling agent.

2. The method of claim 1, wherein said silica or silicate containing minerals are coated with an aqueous solution containing from about 1.0 to about 0.00001% w/v of said aqueously compatible silane coupling agent.

3. A method of preventing the cytotoxicity associated with ground or fractured silica or silicate containing minerals, comprising:
   coating said minerals with an aqueous solution comprising a silane coupling agent selected from the group consisting of:

$R^1-Si-(R^2)_3$ wherein,
   $R^1$ is lower alkyl, $(R^3)$ lower alkyl, (lower alkyl) amine or $((R^3)$ lower alkyl)amine;
   $R^2$ is hydroxy or lower alkoxy; and
   $R^3$ is phenyl, carboxyl, amino, amide, mercapto, (amino) lower alkyl, ((amino) lower alkyl)amine, (lower alkylene) carbonyl, or (epoxy) lower alkyl.

4. The method of claim 3, wherein said silica or silicate containing minerals are aged or freshly ground or fractured, and said cytotoxicity is acute cytotoxicity.

5. The method of claim 4, wherein said silica or silicate containing minerals are coated with an aqueous solution containing from about 1.0 to about 0.00001% w/v of said silane coupling agent.

6. The method of claim 4, wherein said silane coupling agent is selected from a compound of the formula:

$R^1-Si-(R^2)_3$ wherein,
   $R^1$ is lower alkyl, $(R^3)$ lower alkyl, (lower alkyl) amine or $((R^3)$ lower alkyl) amine;

$R^2$ is hydroxy or lower alkyl;

$R^3$ is phenyl, carboxyl, amino, amide, mercapto, (amino) lower alkyl, ((amino) lower alkyl) amine, (lower alkylene) carbonyl, or (epoxy) lower alkyl.

7. The method of claim 3, wherein said silane coupling agent is:
isobutyltrimethoxysilane;
mercaptopropyltrimethoxysilane;
aminopropyltriethoxysilane;
aminopropyltriethoxysilane;
3-methacryloxypropyltrimethoxysilane;
n-(2-aminoethyl)-3-amino-propyltrimethoxysilane;
3-glycidoxypropyltrimethoxysilane; or
n-octyltriethoxysilane.

8. The method of claim 4, wherein said silane coupling agent is:
isobutyltrimethoxysilane;
mercaptopropyltriethoxysilane;
aminopropyltriethoxysilane;
3-methacryloxypropyltrimethoxysilane;
n-(2-aminoethyl)-3-amino-propyltrimethoxysilane;
3-glycidoxypropyltrimethoxysilane; or
n-octyltriethoxysilane.

9. In a process of mining silica or silicate containing minerals, the improvement comprising,
coating said minerals with an aqueous solution comprising a silane coupling agent which is present in the solution in an amount of about 1.0 to 0.00001 w/v%.

10. The process of claim 9, wherein said aqueously compatible silane coupling agent is selected from a compound of the formula:

$$R^1—Si—(R^2)_3$$

wherein,
$r_1$ is lower alkyl, ($R^3$) lower alkyl, (lower alkyl) amine or (($R^3$) lower alkyl)amine;
$R^2$ is hydroxy or lower alkoxy; and
$R^3$ is phenyl, carboxyl, amino, amide, mercapto, (amino) lower alkyl, ((amino) lower alkyl) amine, (lower alkylene) carbonyl, or (epoxy) lower alkyl.

* * * * *